United States Patent Office 3,502,876
Patented Mar. 24, 1970

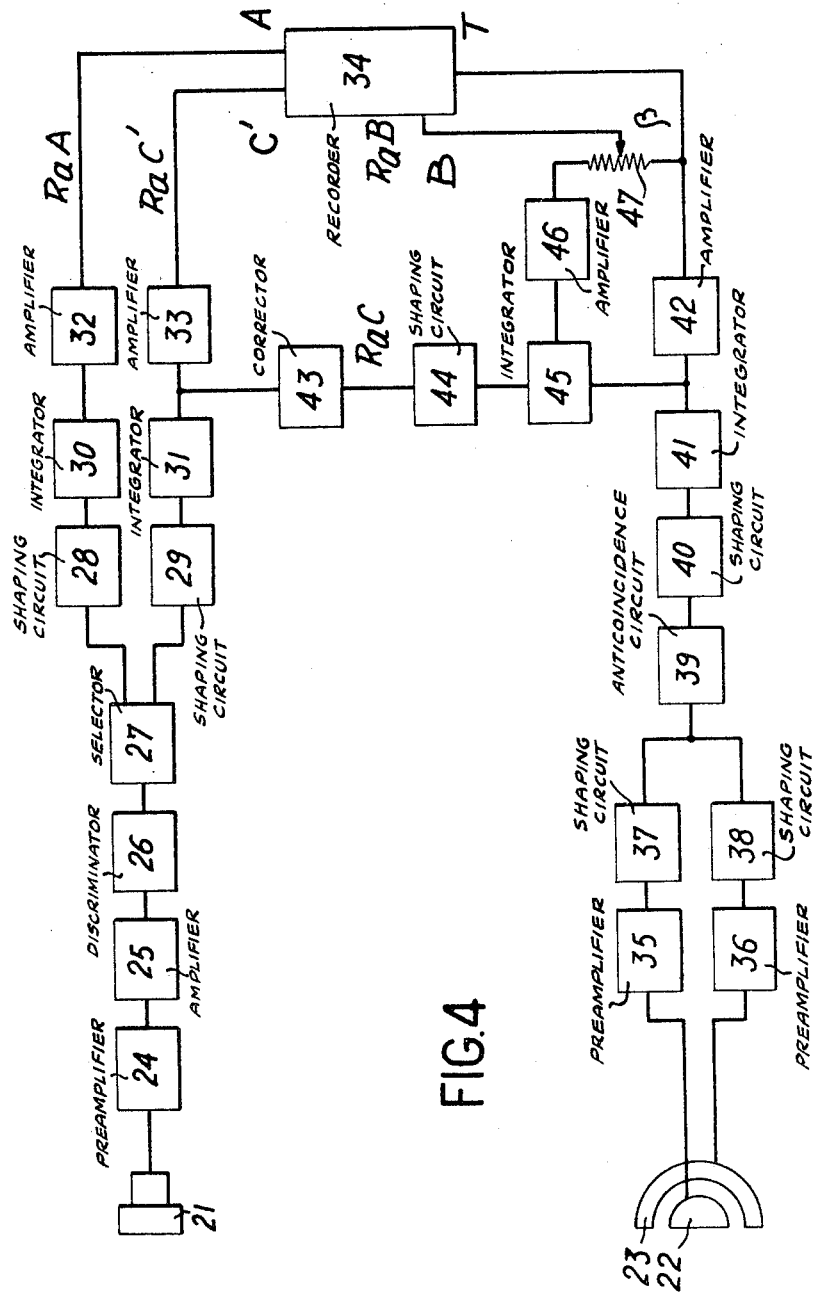

3,502,876
APPARATUS FOR CONTINUOUS AND SIMULTANEOUS MEASUREMENT OF CONCENTRATION IN THE ATMOSPHERE OF THE SHORT-LIVED SOLID DECAY PRODUCTS OF RADON
Claude Lasseur, Clamart, France, assignor to Commissariat a l'Energie Atomique, Paris, France
Filed Mar. 25, 1968, Ser. No. 715,920
Claims priority, application France, Apr. 13, 1967, 102,649
Int. Cl. G01t *1/18*
U.S. Cl. 250—83.6                              6 Claims

ABSTRACT OF THE DISCLOSURE

The concentration in atmosphere of the short life daughter products of radon is measured by a detector having a large junction surface cooperating with a filtration diaphragm. This cooperation provides a satisfactory separation of the alpha emitters (RaA and RaC'). The concentrations of radon and RaC are deduced from those of RaA and RaC' respectively and then the amount of RaB is determined by electronically removing from the total $\beta$ activity computed portion due to the previously determined RaC content.

---

This invention is concerned with an apparatus for taking continuous and simultaneous measurements of concentration in the air of the short-lived solid decay products of radon and to deduce therefrom any disequilibrium which may exist.

The devices which are at present employed estimate either the concentration of radon gas or the total alpha-activity or the total beta-activity but no device gives the natural activity of each radionuclide, namely: radon, radium A (RaA), radium B (RaB), radium C (RaC) or radium C' (RaC').

It should also be noted that the majority of measurements of the natural radioactive component of the atmosphere which is due to radon and its short-lived solid decay products are frequently carried out with non-specialized materials whose main function is in fact the measurement of the artificial component of atmospheric contamination.

The present invention provides a remedy to these disadvantages and shortcomings of the prior art since it proposes an apparatus which is specially designed to follow separately the evolution of each short-lived solid decay product of radon.

More specifically, said apparatus for the continuous measurement of the concentration in the atmosphere of short-lived solid elements resulting from the decay of radon, radium A, radium B, radium C and radium C', by measuring the activity of each of said elements, is characterized in that it comprises:

A filter strip,
A system for moving said strip,
A sampling tube traversed by said strip, said tube being open at one end and connected at the other end to a pumping device through the intermediary of an electrovalve,
An alpha-radiation detector and a beta-radiation detector placed in oppositely-facing relation, one detector being placed above the strip and the other detector being placed beneath said strip, both detectors being placed at a predetermined distance from said sampling tube,
A cyclic control assembly for delivering on the one hand the pulse which opens said electrovalve and defines the commencement of a sampling stage and on the other hand for initiating in particular the operation of the strip-moving system after a given sampling time,
Means for stopping said strip-moving system when that portion of the strip which is present within said tube during the sample stage is located in front of the detectors, An electronic circuit for collecting the pulses supplied by the alpha-radiation detector, comprising especially a two-channel selector which is intended to effect the separation of the pulses corresponding to the alpha-particles emitted by radium A and radium C', and two integrators each disposed in one of the output channels of said selector and supplying a signal which is proportional in one case to the activity of the radium A and in the other case to the activity of the radium C' which are present on the strip, An electronic circuit for collecting the pulses supplied by the beta-radiation detector, comprising especially an integrator which supplies a signal proportional to the total activity of the beta-emitter elements radium B and radium C, and A potentiometric assembly which is intended to subtract the signal representing the activity of RaC deduced from the signal representing the activity of RaC' from the signal representing the total activity of the beta-emitters and which therefore supplies a signal which is proportional to the activity of radium B.

Further properties and advantages of the present invention will become apparent from the description which now follows below, reference being made to the accompanying drawings in which one form of construction of said apparatus is given by way of explanation but not in any limiting sense.

in which $A(t)$ represents the activity of the product at the time $t$ and $A$ represents its activity at equilibrium on the filter. It should be pointed out that these curves are established in the case of equilibrium of the radioactive relationship in the atmosphere. Only the curve relating to RaA always has the same shape.

Figure 3:
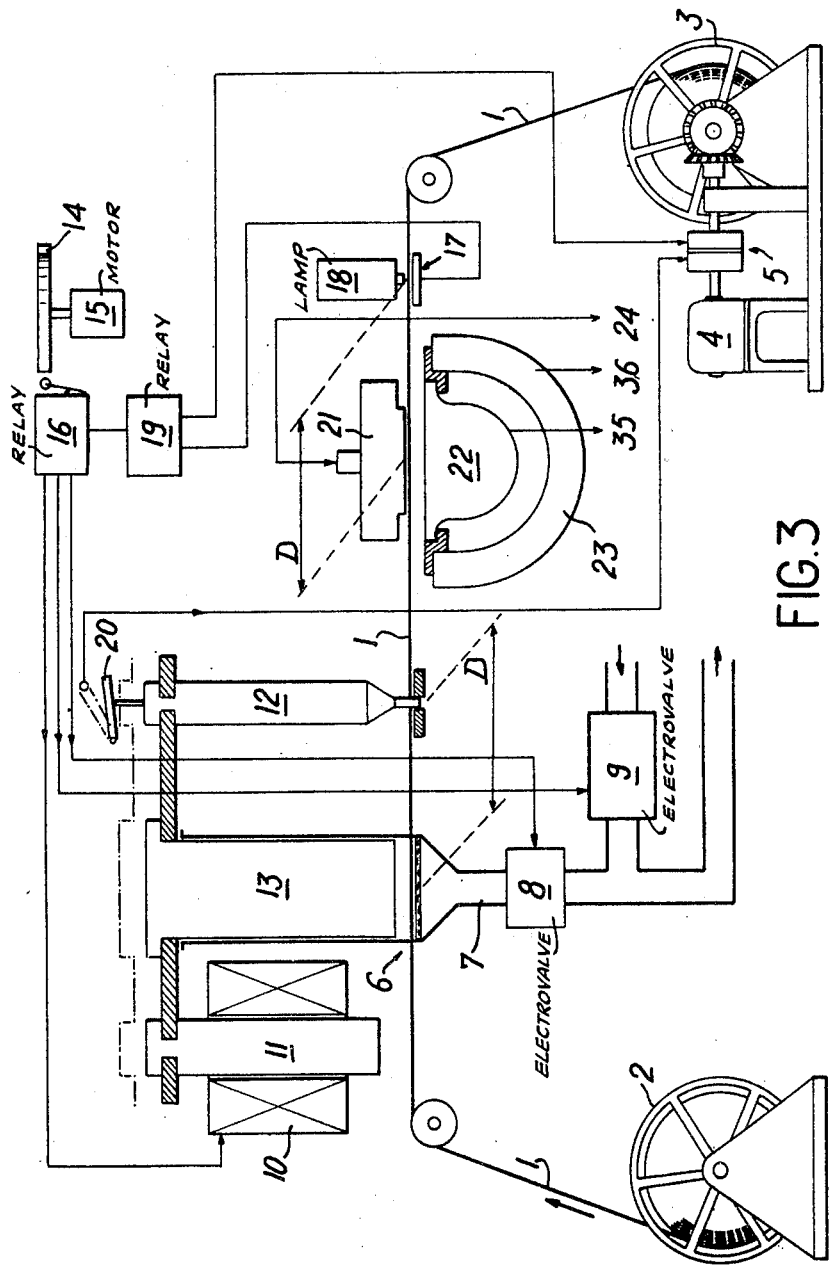

FIG. 3 is a diagram of the apparatus according to the invention without its electronic measuring assembly and, finally, FIG. 4 is the electronic diagram of the measuring assembly.

The evolution of radioactive decay of radon in the atmosphere as well as its collection on a stationary filter call in the first place for the following comments:

(1) There exist two theoretical extreme cases of evolution in the atmosphere, both of radon and its solid decay products: the radioactive equilibrium in which all the decay products have the same activity which is constant in time, and the state of equilibrium in which radon gas is alone present in the initial stage and not renewed. In this second case, each element accordingly tends towards a state of equilibrium with the radon gas.

In the case of a same number of atoms of RaA at the initial instant, it is shown that, at any given that $t$, the activity of RaA always represents the same fraction of the activity of radon at the initial time $t_0$ irrespective of the state of evolution.

(2) A collection on a stationary filter or membrane dissociates the decay products. In fact, as the gas passes through the filtering layer, only the solid elements are retained. The evolution of radioactive decay on the filter is therefore different from the evolution in the atmosphere. However, the activity of each element deposited attains an equilibrium value.

Figure 1:
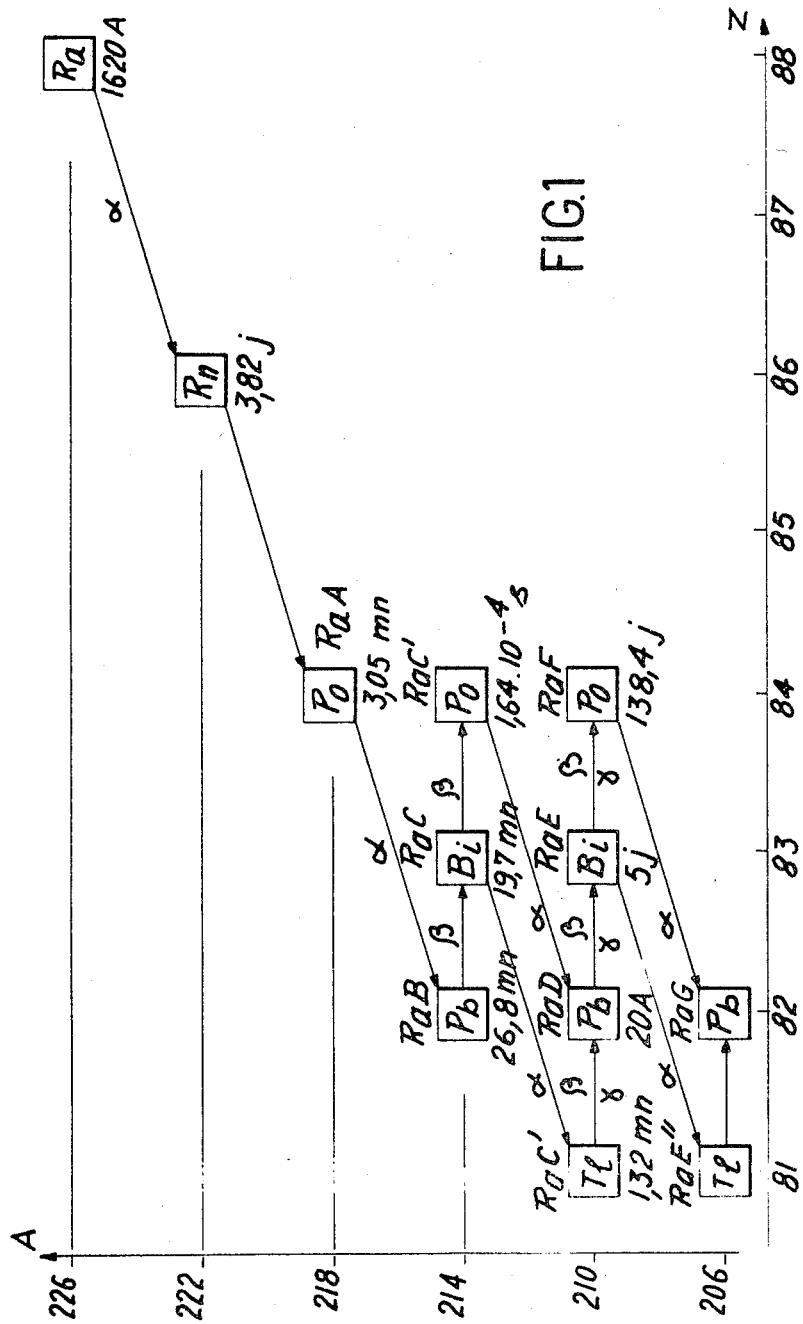
FIG. 1 is the general diagram of decay of the daughter products of radon.
Figure 2:
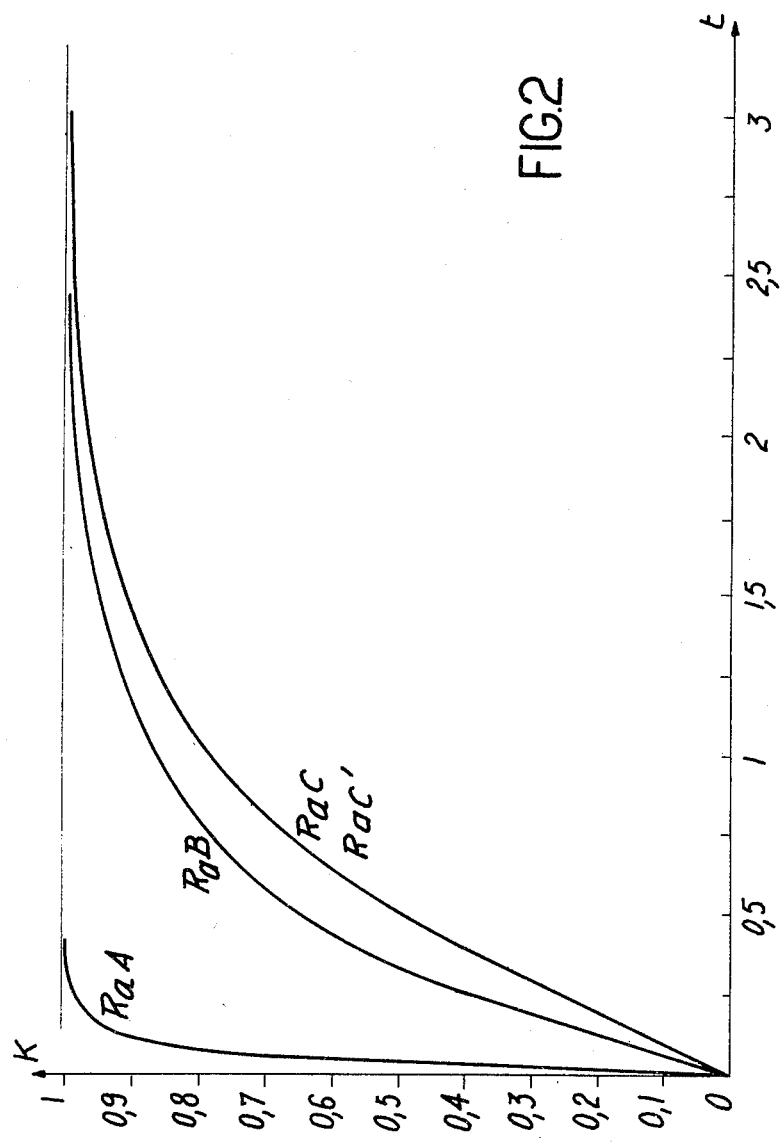
FIG. 2 shows a family of curves showing the evolution on a stationary filter as a function of the sampling time $t$, in hour, of each short-lived decay product of radon and more especially of the ratio $$K = \frac{A(t)}{A}$$

It is demonstrated that, at any given time $t$, the activity of the decay product RaA on the filter always represents the same fraction of its quilibrium activity (FIG. 2).

The two foregoing conclusions therefore make it possible to consider RaA as a reference element for the radon. For a same sampling time and at equilibrium between Rn and RaA, the activity of the RaA deposited on the filter represents a constant fraction of the initial activity of the radon. The concentration of radon gas in the atmosphere can therefore be obtained without entailing measurement.

However, in order to follow the evolution of the decay process with accuracy, the sampling time must be as short as possible. Said sampling time must also be compatible with a deposit activity on the filter which is sufficient to ensure good statistical counting precision over the full range of measurement. The apparatus according to the invention is designed for a sampling time of three minutes.

The principle of the apparatus is also based on the correct spectrometric separation of the alpha emitters RaA and RaC'. The application of this method of measurement has become possible only through the development of large-surface semiconductor detectors. The use of such detectors in an industrial apparatus is relatively simple whereas any other known alpha spectrometer remains essentially a laboratory apparatus. The spectrometry is also improved by the use of a millipore filter membrane which minimizes the energy degradation which is always present in an atmospheric sample on a filter. The junction delivers pulses having amplitudes which are proportional to the energy of the two emitters to be separated (RaA—6 mev. and RaC'—7.68 mev.). The separation is carried out by means of a two-channel selector, the separation threshold of which is adjustable in such a manner as to compensate for any possible displacement of the peaks. Measurement of the concentration of RaC' in the atmosphere also gives the RaC concentration to within 0.04% inasmuch as the latter element decays with a yield of 99.96% to form RCa'.

The measurement of RaB constitutes another essential point of the invention. This element is a beta emitter as is also RaC. Any separation at the detection level is therefore impossible. However, the activity of RaC is known from its alpha measurement after a correction of 0.04%. An electronic subtraction "total beta-activity—RaC activity" is therefore possible after shaping and integration and results in the beta-activity of RaB alone.

Finally, in order to prevent any contamination of the junction, the sampling and measurement are carried out at two different points but, since RaA has a half-life of 3.05 minutes, the movement of translation for sampling beneath the detectors must be rapid. A correction on the decay of said element must be applied in order to take into account the time of transfer and measurement.

The principle of the apparatus is therefore based on four essential concepts:

The theoretical considerations relating to the radioactive decay of radon and its evolution in the atmosphere and on the stationary filter.

The use of a large-surface junction and of a millipore filter membrane for the purpose of obtaining a good spectrometric separation of the alpha-emitters.

The electronic measurement of RaB by subtraction from the total beta-activity of the activity of the RaC which is deduced from its alpha measurement.

The separation of the measurement sample followed by rapid displacement beneath the detectors.

As can be seen from FIG. 3, the apparatus comprises a filter strip 1 having a width of 5 centimeters which is wound at one end onto a payoff reel 2 and at the other end onto a takeup reel 3 which is driven by a motor 4 fitted with an electromagnetic clutch unit 5.

The filter strip 1 passes through the lower portion of a sampling tube 6. This latter has an extension in the form of a duct 7 of smaller diameter which is connected to a pumping plant (not shown) and fitted with a primary-input electrovalve 8 and a secondary-input electrovalve 9. The sampling area is 8 cm.$^2$. The moving armature 11 of an electromagnet 10 is coupled to a punch 12 and an inner tube 13 which is slidably fitted within the sampling tube 6. In the lowermost position, the inner tube 13 rests on the membrane and maintains it against the bottom portion of the sampling tube 6. A timing cam 14 which is driven by a motor 15 produces action on a relay 16 which controls the electrovalves 8 and 9 as well as the electromagnet 10. A photoresistive cell 17 whose exciter lamp is shown at 18 also controls the electromagnet 10 by means of a second relay 19. The excitation contact 20 of the electromagnet clutch unit is located at the top of the punch 12.

The detection unit comprises a semiconductor junction 21 placed above the filter membrane 1 and Geiger-Muller counter 22 which is placed opposite to the junction and beneath said membrane. The junction 21 has a useful area of 9.5 cm.$^2$ and carries out the spectrometric separation of the alpha-emitters (RaA and RaC') whereas the counter 22 which is provided with an input window formed of mica (4 mg./cm.$^2$) and having a useful area of 20 cm.$^2$ detects only beta-radiations (alpha-radiations being stopped by the membrane and by the mica window).

An anticoincidence Geiger-Muller tube 23 having a semi-annular cross-section surrounds the non-detecting surface of the counter 22.

The distance D between the axis of the inner tube 13 and the axis of the punch 12 is the same as the distance from the center of the detectors to the center of the photoresistive cell 17.

The electronic measuring unit is shown diagrammatically in FIG. 4. The pulses delivered by the junction 21 are received in a discriminator 26 after having passed through a preamplifier 24 and an amplifier 25. The separation of the pulses corresponding to the alpha-particles emitted by RaA and RaC' is carried out by means of a two-channel selector 27. The parallel output channels of the pulses due to RaA and to RaC' are identical and each comprise a shaping circuit (28 and 29), an integrator (30 and 31) and a measuring amplifier (32 and 33). Said amplifiers are coupled respectively with the channels A and C' of a recorder 34.

The information collected in channel A therefore gives the activity of the RaA which is present on the membrane. After calibration and determination of the quantity of air which has passed through said membrane during the sampling period, it is thus possible to determine the concentration of RaA in the atmosphere. The recorder can even be graduated directly in concentrations. Moreover, since the measured activity in said channel represents as previously stated a constant fraction of the activity of the radon, it is also possible to deduce from this measurement the concentration of radon gas in the atmosphere.

Similarly, the information collected in channel C' makes it possible to obtain the concentration of RaC' and consequently the concentration of RaC to within 0.04%.

An additional measuring channel may be provided for the purpose of recording the total $\alpha$-activity taken at the output of the amplifier 27 after shaping and integration which is similar to the two other $\alpha$ channels.

The measuring Geiger-Muller counter 22 and anti-coincidence counter 23 deliver pulses which are received respectively by the preamplifiers 35 and 36, then shaped in the circuits 37 and 38. Said pulses meet again at the input of an anticoincidence circuit 39 which has the function of reducing the background of the counting device by eliminating all pulses other than those which are derived from the decay of the beta-emitters retained on the filter strip 1.

The anticoincidence circuit 39 is followed by a shaping circuit 40, an integrator 41 and a measuring amplifier 42 whose output is coupled with the channel T of the recorder 34. The information which serves to obtain the total activity of the beta-emitters appears in said channel T.

Between the integrator 31 and the measuring amplifier 33, the channel for the measurement of RaC' is provided with a branch comprising a device 43 for effecting electronically the correction of yield of 0.04% which makes it possible to obtain at its output pulses corresponding to the activity of the RaC. These pulses are then shaped at 44, then integrated at 45. The integrator 45 is coupled on the one hand to the input of the measuring amplifier 42 and on the other hand to the input of a measuring amplifier 46 which is in turn coupled to the output of the amplifier 42 via a potentiometer 47, the movable contact of which is connected to channel B of the recorder 34.

An arrangement of this kind carries out the electronic subtraction:

Total beta-activity.—Activity of RaC and the information collected in channel B relates to the activity of RaB alone; said information therefore makes it possible to obtain its concentration in the atmosphere.

The recorder in accordance with the invention operates as follows:

The filter strip 1 which is placed directly in the air stream of the sampling tube 6 collects the short-lived solid decay products of radon, namely RaA, RaB, RaC and RaC'.

The moving armature 11 of the electromagnet 10, the movable inner tube 13 of the sampling tube 6 and the punch 12 are accordingly in the bottom position (the top position is shown in chain-dotted line in FIG. 3). A perforation is made in the strip by said punch.

After three minutes of sampling, the timing cam 14 closes the general contact which energizes the control relay 16 of the electrovalves 8 and 9 and of the electromagnet 10. The primary-input electrovalve 8 is accordingly cut off and the secondary-input electrovalve 9 is energized, with the result that the filter strip 1 is no longer applied against the bottom portion of the sampling tube 6. At the same time, the electromagnet 10 is energized, its moving armature 11 being thus attracted upwards and accompanied in its movement by the movable inner tube 13 of the sampling tube as well as by the punch 12. The upward motion of said punch causes the excitation contact of the electromagnetic clutch unit 5 to close at 20, thereby coupling the driving motor 4 to the takeup reel 3 of the membrane strip.

The clutch unit 5 being energized, the punch 12 and the inner tube 13 being in the top position, the sample then moves beneath the detectors. When the hole formed by the punch 12 in the filter strip reaches the level of the photo-resistive cell 17, said cell receives a luminous flux which it converts to electric current. This current then energizes the relay 19 which cuts off the supply of current to the electromagnet 10. The armature 11 is then released and drives downwards the movable inner tube 13 of the sampling tube as well as the punch 12 which are thus located once again in their initial positions. A further perforation is then made in the strip 1. The downward motion of the punch has the effect of opening at 20 the excitation contact of the electromagnetic clutch unit 5. The reels no longer rotate and the sample is thus positioned exactly in front of the detectors 21 and 22.

On completion of the above-described transfer operations which are carried out in less than twenty seconds, the four measurements are recorded at a rate of one channel every four seconds. Thus, the transfer and the recording are carried out in twenty seconds. Twenty seconds after the initial pulse, the timing cam 14 delivers a second pulse which restores the relays 16 and 19 to their rest positions. The primary-input electrovalve 8 is then energized whilst the secondary-input electrovalve 9 is cut off. The membrane is again maintained applied against the lower portion of the sampling tube 6. A further sampling and a further measurement may then be carried out.

It will be noted that all the electric devices with the exception of the electrovalve 8 are in the rest pisition while the counting and sampling operations are being performed. The control of the electromagnetic clutch unit 5 by means of the punch 12 is a safety feature. The filter strip can only be run-off if the sleeve 13, the punch 12 and the armature 11 of the electromagnet are in the top position. Any possible tearing of the membrane is thus avoided.

Starting from the first cycle, the photoresistive cell 17 is continuously energized by the luminous flux. A time-delay circuit (which is not shown in the figures) renders the cell inoperative for a period of time which is sufficient to permit the paper to move forward by a few millimeters. This solution is preferred to a cyclic interruption of the exciter lamp 18, inasmuch as repeated interruption would in fact damage the lamp in a very short time.

The separate measurement of the decay products of radon which can be carried out by means of the apparatus in accordance with the invention is of considerable practical interest. In point of fact, it is assumed in the majority of devices for measuring contamination that radon and its short-lived daughter elements are in a state of radioactive equilibrium. However, the concentrations of radon undergo substantial day-time or night-time variations (a factor of 100). Consequently, the equilibrium is upset and it becomes necessary to follow the evolution of each daughter element separately. This distinction offers a substantial advantage in a certain number of cases.

The most immediate application of the apparatus is in mines in which the concentrations are of the order of (or higher than) the maximum permissible concentration of radon. This latter undergoes substantial fluctuations (factor of 100 to 1,000) over very short time intervals during mining of ore by blasting since the radon which is trapped within the rock is released instantaneously. The constant evolution of the gas and of its solid decay products produces substantial variations in accumulated doses at the level of the bronchi in mine workers and it is useful to know at each instant the concentration of each decay product in the atmosphere.

Moreover, radon is widely employed in meteorology as radioactive tracer for the study and measurement of various parameters.

A knowledge of the evolution of each element must therefore permit much finer measurements than those which are based on the total alpha or beta activity, especially during sharp variations in diffusion parameters (wind, temperature gradient and so forth).

Finally, the separate measurements of the decay products of radon is of interest in many other cases, of which a few examples are given below without any intended limitation:

(a) Measurement of the natural radioactivity in building premises and comparison with the surrounding atmosphere.

(b) Measurement of the natural radioactivity in special premises such as ventilated premises which are supplied with either filtered or unfiltered air, halls of reactor buildings and so forth.

(c) Measurement of the artificial radioactive contamination, alpha (PuU). This measurement is possible by displacement of the lower and upper thresholds of the RaA channel. There is obtained a channel of variable width which isolates the peak of the emitter to be selected.

(d) Comparison between the measurements of natural radioactivity given by contamination devices which are not suited to this type of measurement and those of the apparatus under consideration.

It will be apparent that the present invention has been described in the foregoing by way of explanation but not in any sense by way of limitation and that any detail modifications may be contemplated without thereby departing from the scope of the invention.

In the apparatus hereinabove described, sampling and measurement are performed in three minutes and the transfer operations in twenty seconds but it is understood that any other cycle may be employed, in which case it is merely necessary to make use of a different timing cam.

What I claim is:

1. An apparatus for the continuous measurement of the concentration in the atmosphere of short-lived solid elements resulting from the decay of radon, namely, radium A, radium B, radium C and radium C′, by measuring the activity of each of said elements, and comprising:

a filter strip, a system for moving said strip, a sampling tube traversed by said strip, said tube being open at one end and connected at the other end to a pumping device through the intermediary of an electrovalve, an alpha-radiation detector and a beta-radiation detector placed in oppositely-facing relation, one detector being placed above the strip and the other detector being placed beneath said strip, both detectors being placed at a predetermined distance from said sampling tube, a cyclic control assembly for delivering on the one hand the pulse which opens said electrovalve and defines the commencement of a sampling stage and on the other hand for initiating in particular the operation of the strip-moving system after a given sampling time, means for stopping said strip-moving system when that portion of the strip which is present within said tube during the sampling stage is located in front of the detectors, an electronic circuit for collecting the pulses supplied by the alpha-radiation detector, comprising especially a two-channel selector which is intended to effect the separation of the pulses corresponding to the alpha-particles emitted by the radium A and radium C′, and two integrators each disposed in one of the output channels of said selector and supplying a signal which is proportional in one case to the activity of the radium A and in the other case to the activity of the radium C′ which are present on the strip, an electronic circuit for collecting the pulses supplied by the beta-radiation detector, comprising especially an integrator which supplies a signal proportional to the total activity of the beta-emitter elements radium B and radium C, and a potentiometric assembly which is intended to subtract the signal representing the activity of RaC deduced from the signal representing the activity of RaC′ from the signal representing the total activity of the beta-emitters and which therefore supplies a signal which is proportional to the activity of radium B.

2. An apparatus in accordance with claim 1, characterized in that the system for moving the filter strip comprises:

two reels onto which said strip is wound at both ends, and a motor for driving one of said reels in rotation and fitted with an electromagnetic clutch unit.

3. An apparatus in accordance with claim 1, characterized in that the cyclic control assembly comprises:

a timing cam, an electromagnet whose armature controls the excitation contact of the electromagnetic clutch unit, and an electric relay controlled by said cam and adapted to initiate on the one hand the opening and closure of said electrovalve and on the other hand the energization of said electromagnet.

4. An apparatus in accordance with claim 1, characterized in that said means for stopping the strip-moving system comprise:

a punch placed on the path of said strip at a distance D from the sampling tube, said punch being coupled to the armature of said electromagnet so as to produce a perforation in the strip when said electromagnet is not energized, a photosensitive cell and a light source for exciting said cell which are disposed in oppositely facing relation above and beneath the strip at a distance D from the radiation detectors, said photosensitive cell being connected to a relay which cuts off the supply of current to the electromagnet when the cell is energized, thus opening the contact which serves to energize the electromagnet clutch unit of the motor.

5. An apparatus in accordance with claim 1, characterized in that the alpha-radiation detector is a semiconductor junction.

6. An apparatus in accordance with claim 2, characterized in that the beta-radiation detector is a Geiger-Muller tube having an input window of sufficient thickness to stop the alpha-particles of radium A and radium C′.

References Cited
UNITED STATES PATENTS

| | | | |
|---|---|---|---|
| 2,892,091 | 6/1959 | Sawle | 250—43.5 X |
| 2,972,678 | 2/1961 | Anton | 250—83.6 X |
| 3,092,723 | 6/1963 | Payne et al. | 250—106 X |
| 3,109,096 | 10/1963 | Spaa | 250—83.6 X |

ARCHIE R. BORCHELT, Primary Examiner

D. L. WILLIS, Assistant Examiner

U.S. Cl. X.R.

250—106